United States Patent
Conway et al.

(10) Patent No.: US 10,872,706 B2
(45) Date of Patent: Dec. 22, 2020

(54) APPARATUS FOR PASSIVELY COOLING A NUCLEAR PLANT COOLANT RESERVOIR

(71) Applicant: Westinghouse Electric Company LLC, Cranberry Township, PA (US)

(72) Inventors: Lawrence E. Conway, Monroeville, PA (US); Gary L. Sedlacek, Jefferson Hills, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 2262 days.

(21) Appl. No.: 14/195,878

(22) Filed: Mar. 4, 2014

(65) Prior Publication Data
US 2020/0335233 A1 Oct. 22, 2020

Related U.S. Application Data

(60) Provisional application No. 61/781,274, filed on Mar. 14, 2013.

(51) Int. Cl.
*G21C 9/00* (2006.01)
*G21D 1/02* (2006.01)
*G21C 15/18* (2006.01)

(52) U.S. Cl.
CPC ............ *G21D 1/02* (2013.01); *G21C 15/18* (2013.01)

(58) Field of Classification Search
CPC ........ G21C 15/00; G21C 15/24; G21C 15/28; G21C 19/00; G21D 1/02
See application file for complete search history.

(56) References Cited

U.S. PATENT DOCUMENTS

| 8,559,584 B2 | 10/2013 | Cook | |
| 2005/0183421 A1* | 8/2005 | Vaynberg | F01K 25/08 60/641.8 |
| 2011/0158371 A1* | 6/2011 | Sato | G21C 1/086 376/249 |
| 2012/0051484 A1* | 3/2012 | Schmidt | G21C 19/07 376/273 |

(Continued)

FOREIGN PATENT DOCUMENTS

| CN | 102282627 | 12/2011 |
| CN | 202549319 | 11/2012 |
| JP | H02223896 A | 9/1990 |

(Continued)

OTHER PUBLICATIONS

International Search Report and Written Opinion of the International Searching Authority for PCT/US2014/022254 dated Aug. 12, 2014 (Forms PCT/ISA/220, PCT/ISA/210, PCT/ISA/237).

(Continued)

*Primary Examiner* — Marshall P O'Connor
(74) *Attorney, Agent, or Firm* — K&L Gates LLP

(57) ABSTRACT

A passive cooling system for cooling the in-containment refueling water storage tank and the spent fuel pool of nuclear power plants that can extend the number of days the plants can safely be maintained without operator intervention. The cooling system employs a thermosiphon in a closed loop cycle that circulates a refrigerant around the cooling loop between heat exchangers within the spent fuel and in-containment refueling water and the ambient atmosphere outside the containment, by natural circulation.

13 Claims, 5 Drawing Sheets

(56) References Cited

U.S. PATENT DOCUMENTS

2012/0294407 A1 11/2012 Namba et al.
2012/0294737 A1* 11/2012 Singh .................. F28B 1/06
 417/410.1

FOREIGN PATENT DOCUMENTS

| JP | 05-273392 A | 10/1993 |
| JP | 2009-318783 | 12/1997 |
| JP | 2012-122887 | 6/2012 |
| JP | 2012122887 A | 6/2012 |
| JP | 2012-233698 | 11/2012 |
| JP | 2012233698 A | 11/2012 |
| WO | 2003072384 | 9/2003 |
| WO | 2012145406 | 10/2012 |

OTHER PUBLICATIONS

Westinghouse Electric Company LLC, EP 14774517.8 Supplemental Search Report, dated Oct. 10, 2016, 8 pgs.

* cited by examiner

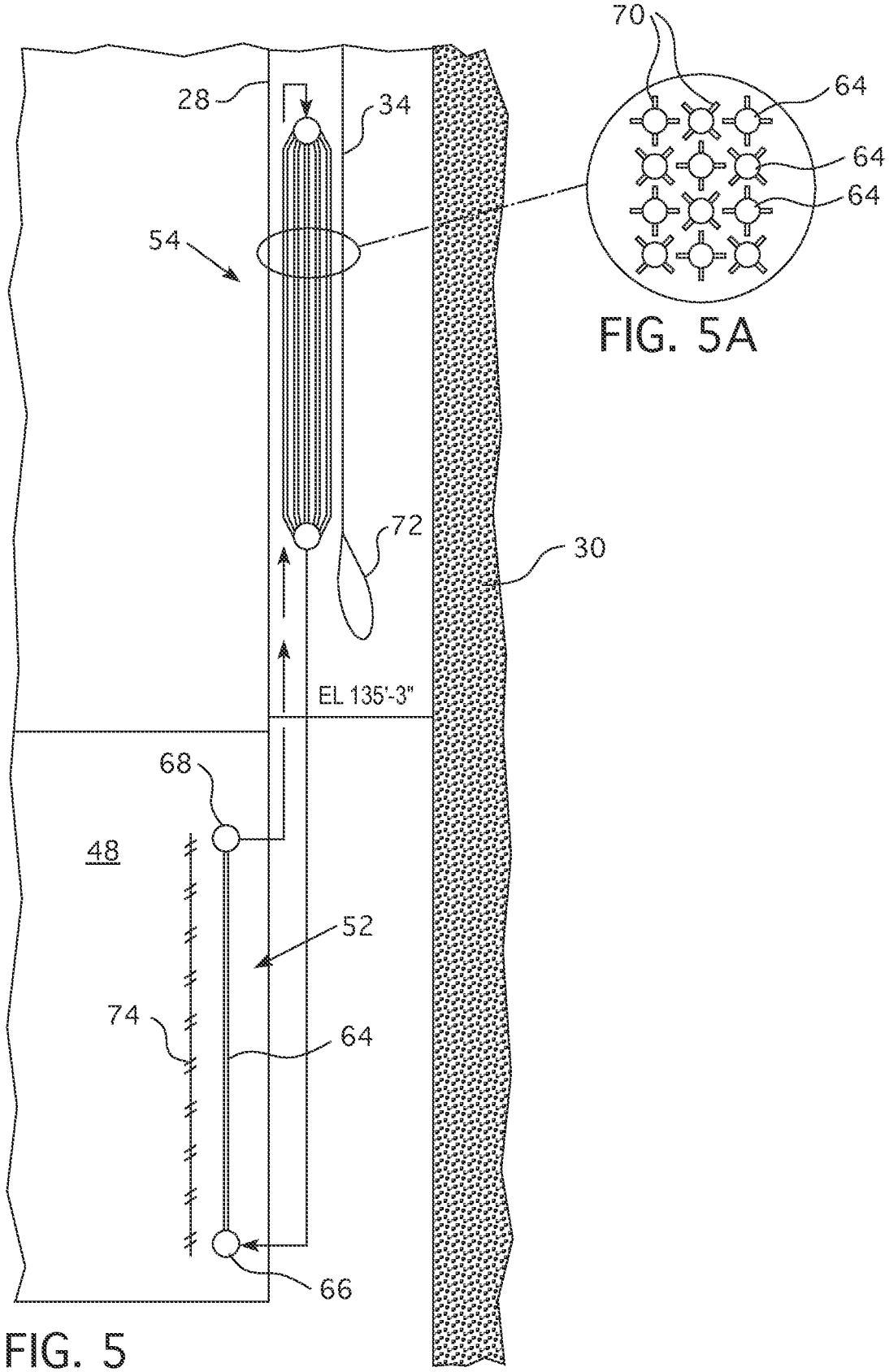

_US 10,872,706 B2_

APPARATUS FOR PASSIVELY COOLING A NUCLEAR PLANT COOLANT RESERVOIR

CROSS REFERENCE TO RELATED APPLICATIONS

This application claims priority under 35 U.S.C. § 119(e) to U.S. Provisional Patent Application Ser. No. 61/781,274, filed Mar. 14, 2013, entitled APPARATUS FOR PASSIVELY COOLING A NUCLEAR PLANT COOLANT RESERVOIR. This invention is also related to U.S. patent application Ser. No. 14/195,890, entitled IN-CONTAINMENT SPENT FUEL STORAGE TO LIMIT SPENT FUEL POOL WATER MAKEUP, now U.S. Pat. No. 10,522,257, issued Dec. 31, 2019, filed concurrently herewith.

BACKGROUND

1. Field

The present invention relates generally to a passive cooling system for nuclear power plant coolant reservoirs and more specifically to such a system for cooling the in-containment refueling water storage tank and the spent fuel pool.

2. Related Art

The primary side of nuclear reactor power generating systems creates steam for the generation of saleable electricity. For reactor types such as pressurized water reactors or liquid metal cooled reactors, the primary side comprises a closed circuit which is isolated and in heat exchange relationship with a secondary circuit for the production of useful steam. For reactor types such as boiling water reactors or gas cooled reactors, the gas used for generating saleable electricity is heated directly in the reactor core. A pressurized water reactor application will be described as an exemplary use of the concepts claimed hereafter; though it should be appreciated that other types of reactors may benefit equally from the concepts disclosed herein as well.

The primary side of a pressurized water reactor system comprises a reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes, which are connected to the vessel, form a loop of the primary side. For the purpose of illustration, FIG. 1 shows a simplified pressurized water nuclear reactor primary system, including a generally cylindrical reactor pressure vessel 10 having a closure head 12 enclosing a nuclear core 14. A liquid reactor coolant, such as water, is pumped into the vessel 10 by pumps 16 through the core 14 where heat energy is absorbed and is discharged through a heat exchanger 18, typically referred to as a steam generator, in which heat is transferred to a utilization circuit (not shown) such as a steam driven turbine generator. The reactor coolant is then returned to the pumps 16 completing the primary loop. Typically, a plurality of the above-described loops are connected to a single reactor vessel 10 by reactor coolant piping 20.

Pressurized water nuclear reactors are typically refueled on an 18-month cycle. During the refueling process, a portion of the irradiated fuel assemblies within the core are removed and replenished with fresh fuel assemblies which are relocated around the core. The removed spent fuel assemblies are typically transferred under water out of the reactor containment 22 to a separate building that houses a spent fuel pool, figuratively shown in FIG. 1 and designated by reference character 24, in which these radioactive fuel assemblies are stored. The water in the spent fuel pool is deep enough to shield radiation to an acceptable level and prevents the fuel rods within the fuel assemblies from reaching temperatures that could breach the cladding of the fuel rods which hermetically house the radioactive fuel material and fission products. Cooling continues at least until the decay heat within the fuel assemblies is brought down to a level where the temperature of the assemblies is acceptable for dry storage.

Events in Japan's Fukushima Dai-ichi Nuclear Power Plant reinforced concerns over the possible consequences of the loss of power over an extended period to the systems that cool spent fuel pools. As a result of this tsunami, there was a loss of off-site and on-site power which resulted in a station blackout period. The loss of power shut down the spent fuel pool cooling systems. The water in some of the spent fuel pools dissipated through vaporization and evaporation due to a rise in the temperature of the pools, heated by the highly radioactive spent fuel assemblies submerged therein. Without power over an extended period to pump replacement water into the pools, the fuel assemblies could potentially become uncovered, which could, theoretically, raise the temperature of the fuel rods in those assemblies, possibly leading to a breach in the cladding of those fuel rods and the possible escape of radioactivity into the environment.

More recently designed passively cooled nuclear plants, such as the AP1000® nuclear plant design offered by Westinghouse Electric Company LLC, Cranberry Township, Pa., which utilizes passive safety systems, has been evaluated to be able to continue to provide cooling for at least three days following an extreme event like the one at Fukushima.

It is an object of this invention to modify the way the water that is used to cool spent fuel is cooled so that the spent fuel can be cooled for at least ten days following a Fukushima type of event.

It is a further object of this invention to provide such cooling passively to enable a commercial 1.100 megawatt nuclear plant to provide core and spent fuel cooling using passive means for ten or more days.

SUMMARY

These and other objects are achieved by a nuclear power plant having a nuclear steam supply system hermetically housed within a containment. A reservoir, comprising water, is housed within or within proximity of the containment. Spent nuclear fuel is submerged within the reservoir and cooled by the water and a thermosiphon is positioned to extend from within the reservoir to an exterior of the containment to passively transfer heat in the reservoir to air outside the containment. In one embodiment, the thermosiphon comprises a first and second heat exchanger with the second heat exchanger at a higher elevation than the first heat exchanger. The first heat exchanger is at least partially immersed within the reservoir which places the water in the reservoir on the first side of the first heat exchanger in thermal communication with a working fluid on the second side of the heat exchanger. The second side of the first heat exchanger is in fluid communication with the first side of the second heat exchanger through a closed loop in which the working fluid circulates, which places the working fluid on the first side of the second heat exchanger in thermal communication with ambient air outside the containment on the second side of the second heat exchanger. In a preferred embodiment, the working fluid is a refrigerant and the closed loop outside the containment comprises a finned tube. Preferably, the containment comprises a steel shell extending substantially around the containment and having substantially vertical walls that extend from a lower portion of the containment to an upper portion of the containment. Desirably, an air baffle extends substantially around and spaced from the vertical walls of the containment with an air inlet at a lower elevation of the air baffle and an air outlet at an upper elevation of the air baffle, the second heat exchanger being supported within an annulus between the vertical wall of the containment and the air baffle. Preferably, the second heat exchanger is supported in a lower portion of the annulus.

In another embodiment, the first heat exchanger includes a plurality of first heat exchangers, the second heat exchanger includes a plurality of second heat exchangers and the closed loop includes a plurality of closed loops. The plurality of closed loops are configured to operate in parallel with each of the closed loops having at least one of the first heat exchangers and at least one of the second heat exchangers. Preferably, each of the second heat exchangers are spaced around the outside of the containment. Desirably, the closed loop includes a valve for cutting off circulation of the working fluid.

In one embodiment, the reservoir is a refueling water storage tank within the containment. In this application, the first heat exchanger is within the containment and the second heat exchanger is outside the containment. In another embodiment, the reservoir is a spent fuel pool outside of and within proximity of the containment.

BRIEF DESCRIPTION OF THE DRAWINGS

A further understanding of the invention can be gained from the following description of the preferred embodiments when read in conjunction with the accompanying drawings in which:

FIG. 5 is a schematic diagram showing the containment shell with the first fluid to fluid heat exchanger shown in the in-containment refueling water storage tank and the second gas to air heat exchanger shown above the elevation of the first heat exchanger, in the annulus between the containment shell and an air baffle; and FIG. 5A is an enlargement of the finned heat exchange tubes employed in the gas to air heat exchanger 2 in the annulus between the containment shell and the air baffle.

DESCRIPTION OF THE PREFERRED
EMBODIMENT

Figure 1:
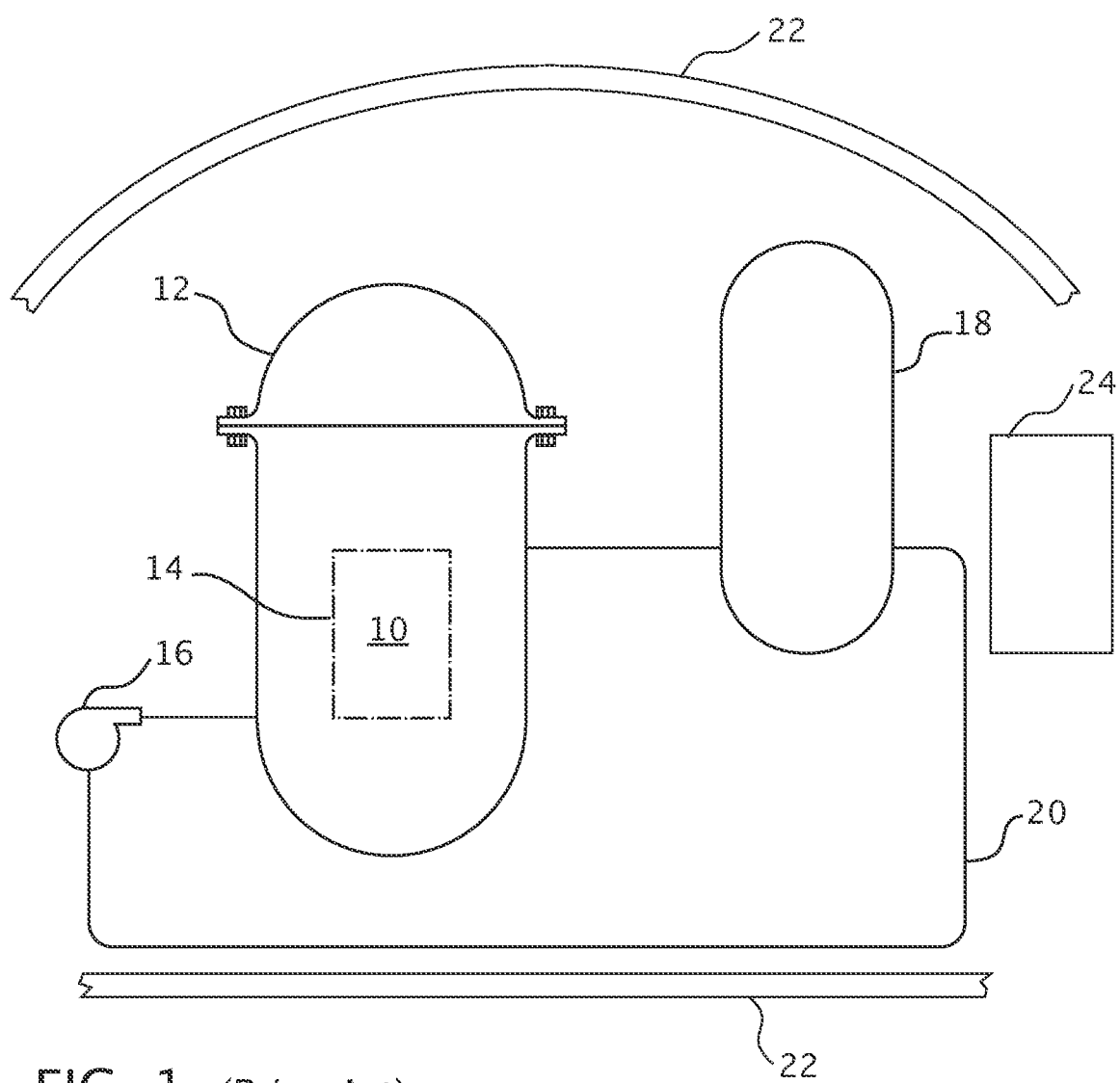
FIG. 1 is a simplified schematic of a conventional nuclear reactor system.
Figure 2:
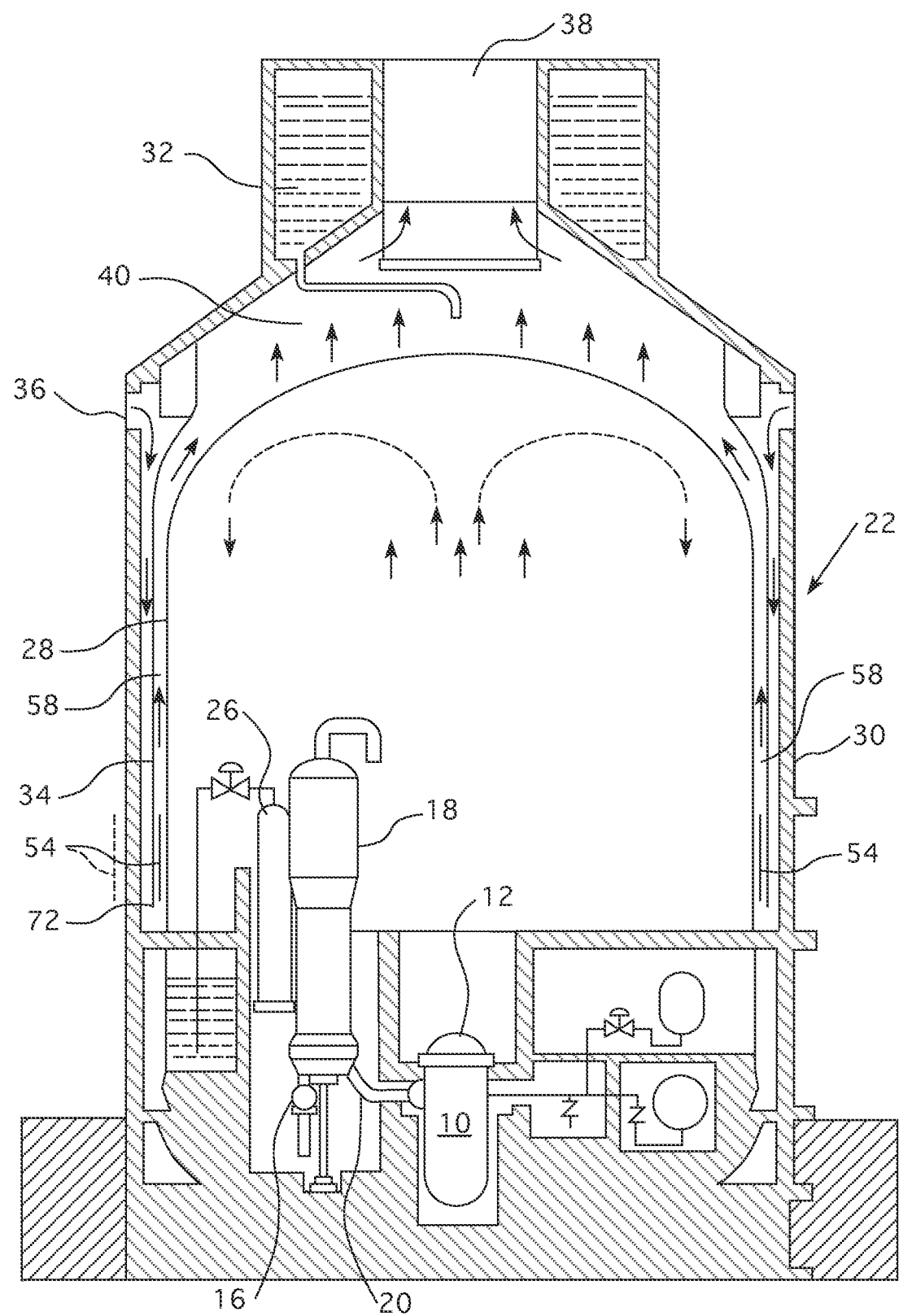
FIG. 2 is a simplified schematic of an AP1000® nuclear steam supply system shown within its passively cooled containment.

As previously mentioned, in the unlikely event of a Fukushima type of occurrence, the AP1000® plant is designed to utilize passive safety systems, such as the passively cooled containment 22 shown in FIG. 2, to continue to provide cooling for at least three days. One of the safety systems for accomplishing that objective is the passive containment cooling system illustrated in FIG. 2. The passive containment cooling system 22 surrounds the AP1000® nuclear steam supply system, including the reactor vessel 10, steam generator 18, pressurizer 26 and the main coolant circulation pump 16; all connected by the piping network 20. The containment system 22 in part comprises a steel dome containment vessel enclosure 28 surrounded by a concrete shield building 30 which provides structural protection for the steel dome containment vessel 28.

The major components of the passive containment cooling system are a passive containment cooling water storage tank 32, an air baffle 34, an air inlet 36, an air exhaust 38 and a water distribution system 40. The passive containment cooling water storage tank 32 is incorporated into the shield building structure 30, above the steel dome containment vessel 28. An air baffle 34 located between the steel dome containment vessel 28 and the concrete shield building 30 defines the air cooling flow path which enters through an opening 36 in the shield building 30 at an elevation approximately at the top of the steel dome containment 28. After entering the shield building 30, the air path travels down one side of the air baffle 34 and reverses direction around the air baffle at an elevation adjacent the lower portion of the steel dome containment vessel and then flows up between the baffle and the steel dome containment vessel 28 and exits at the exhaust opening 38 in the top of the shield building 30. The exhaust opening 38 is surrounded by the passive containment cooling water storage tank 32.

In the unlikely event of an accident, the passive containment cooling system provides water that drains by gravity from the passive containment cooling water storage tank 32 and forms a film over the steel dome containment vessel 28. The water film evaporates thus removing heat from the steel dome containment building 28.

The passive containment cooling system is capable of removing sufficient thermal energy, including subsequent decay heat, from the containment atmosphere following a design basis event resulting in containment pressurization, such that the containment pressure remains below the design value with no operator action required for at least 72 hours.

The air flow path that is formed between the shield building 30, which surrounds the steel dome containment vessel 28, and the air baffle 34 results in the natural circulation of air upward along the containment vessels' outside steel surface. This natural circulation of air is driven by buoyant forces when the flowing air is heated by the containment steel surface and when the air is heated by and evaporates water that is applied to the containment surface. The flowing air also enhances the evaporation that occurs from the water surface. In the event of an accident, the convective heat transfer to the air by the containment steel surface only accounts for a small portion of the total heat transfer that is required, such total heat transfer being primarily accomplished by the evaporation of water from the wetted areas of the containment steel surface, which cools the water on the surface, which then cools the containment steel, which then cools the inside containment atmosphere and condenses steam within the containment.

In order to maintain a sufficient transfer of heat from the steel dome containment vessel 22 to limit and reduce containment pressure, after the initial three days following a postulated design basis event, the AP1000® passive containment cooling system requires that the water continues to be applied to the containment outside steel surface. The water is provided initially by the passive gravity flow mentioned above. After three days, water is provided by active means initially from on-site storage and then from other on-site or off-site sources. A more detailed understanding of this containment cooling process can be found in U.S. patent application Ser. No. 13/444,932, filed Apr. 12, 2012.

Figure 3:
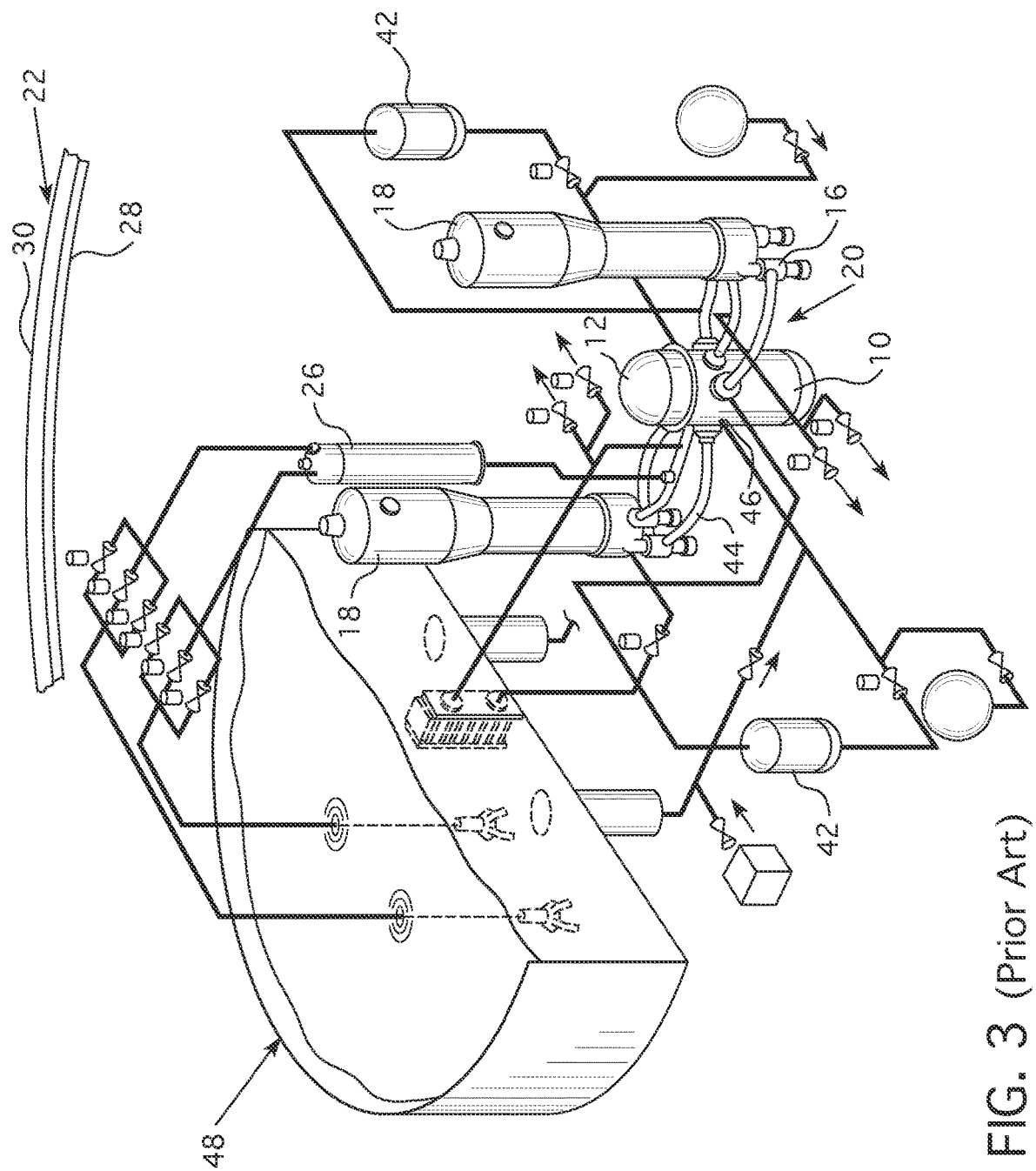
FIG. 3 is an isometric view of the in-containment layout of the components of the AP1000® nuclear steam supply system shown in FIG. 2.

In addition, the AP1000® has passive systems to assure that the fuel assemblies in the core remain covered with coolant. In the unlikely event of a primary coolant loop leak, these systems are automatically activated. A coolant loss may involve only a small quantity, whereby additional coolant can be injected from a relatively small high pressure make-up water supply, without depressurizing the reactor coolant circuit. If a major loss of coolant occurs, it is necessary to add coolant from a low pressure supply containing a large quantity of water. Since it is difficult using pumps to overcome the substantial pressure of the reactor coolant circuit, e.g., 2,250 psi or 150 bar, the reactor coolant circuit is automatically depressurized in the event of a major coolant loss so that the coolant water may be added from an in-containment refueling water storage tank, at the ambient pressure within the nuclear reactor containment dome 28. Thus, as shown in FIG. 3, there are two sources of coolant makeup for a loss of coolant in the AP1000® nuclear reactor system. An inlet of the high pressure core make-up tank 42 is coupled by valves to the reactor coolant inlet or cold leg 44. The high pressure core make-up tank 42 is also coupled by motorized valves and check valves to a reactor vessel injection inlet 46. The high pressure core make-up tank 42 is operable to supply additional coolant to the reactor cooling circuit 20, at the operational pressure of the reactor, to make up for relatively small losses. However, the high pressure core make-up tank 42 contains only a limited supply of coolant, though, as can be appreciated from FIG. 3, there are two core make-up tanks in this system.

A much larger quantity of coolant is available from the in-containment refueling water storage tank 48, at atmospheric pressure, due to a vent, which opens from the tank 48 into the interior of the containment building 28. U.S. patent application Ser. No. 12/972,568, filed Dec. 20, 2010 (U.S. Publication No. 2012/0155597, published Jun. 1, 2012), and assigned to the assignee of this application, describes in more detail how the reactor system is depressurized so that cooling water can be drained from the in-containment refueling water storage tank 48 into the reactor vessel 10.

This invention is an improvement upon the other safety systems of the AP1000® plant by extending the capability to provide spent fuel pool cooling by minimizing the decay heat emanating from the spent fuel in the spent fuel pool by storing the most recently off-loaded spent fuel from the reactor, in the containment for one fuel cycle before that spent fuel is transferred to the spent fuel pool, as described in co-pending application Ser. No. 14/195,890. This invention supplements that process by enabling the spent fuel pool and the in-containment refueling water storage tank to be cooled by air such that decay heat from both the spent fuel and from the reactor core can be transferred to the environment for an extended period of time. Four weeks or a longer period of time is achievable before water make-up is required, with no reliance on electrical power or external assistance. The modification provided herein would: (i) keep the spent fuel pool water sub-cooled and thus eliminate boiling of the spent fuel pool water and steaming to the environment (storage of the most recently off-loaded spent fuel within the containment over one fuel cycle, disclosed in the above cited copending application, minimizes the heat transfer surface required for air cooling of the spent fuel pool water); and (ii) reduce the rate at which the in-containment refueling water storage tank water is boiled and provide additional heat transfer to the air so that combined with the passive containment cooling system there would be no need for continued water application to the containment external surface after the water in the passive containment cooling system water storage tank has drained (in three days).

Figure 4:
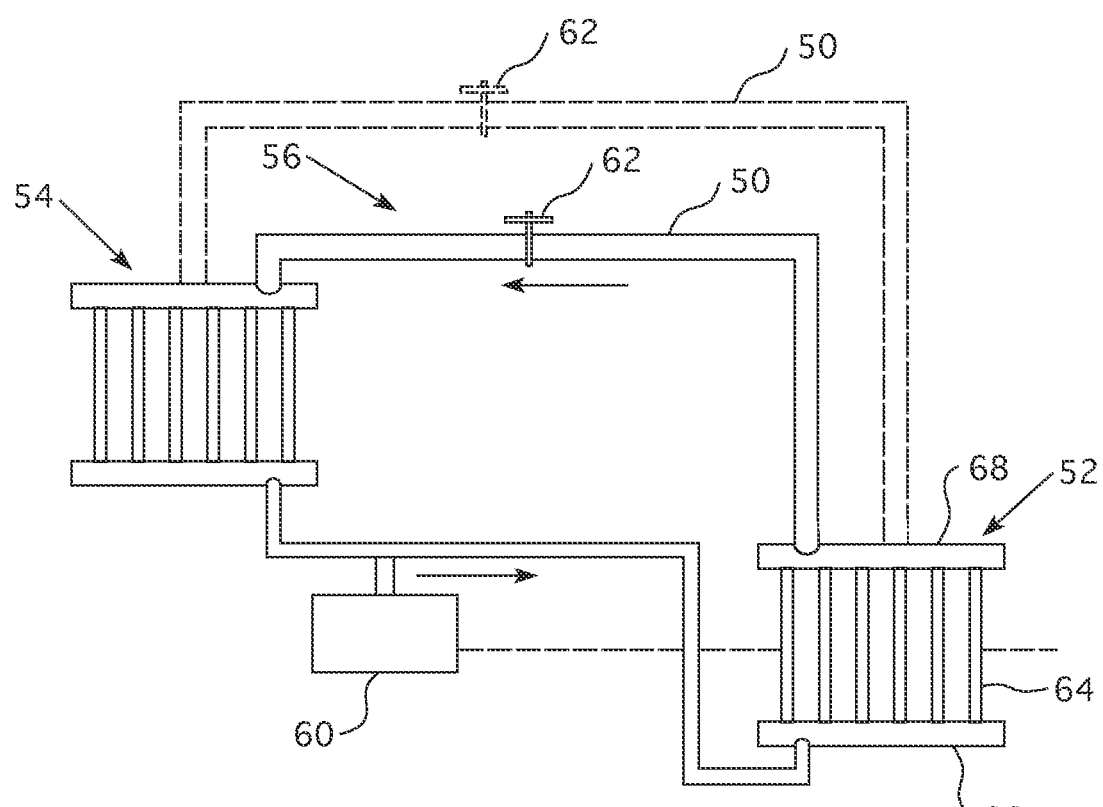
FIG. 4 is a schematic diagram showing the first and second heat exchanger configurations used in the thermosiphon employed with this invention.

One preferred embodiment of this invention is to have separate, multiple cooling loops for the spent fuel pool and the in-containment refueling water storage tank as schematically illustrated in FIG. 4, where each loop 50 includes a heat exchanger 52 (heat exchanger 1) which would be submerged in the spent fuel pool or the in-containment refueling water storage tank water, an air-cooled heat exchanger 54 (heat exchanger 2) located in the lower portion of the passive containment cooling system cooling annulus or outside the containment building 22 (as figuratively shown by the dotted line 54 in FIG. 2), and a small surge tank 60 that maintains the coolant level within the cooling loop 50. The loop in effect forms a thermosiphon. Convective movement of the liquid starts when the liquid in the loop is heated at heat exchanger 1 (52) causing it to expand and become less dense, and thus more buoyant than the cooler working fluid in the bottom of the loop 50. Convection moves the heated liquid upward in the system as it is simultaneously replaced by cooler liquid returning by gravity that is cooled by heat exchanger 2 (54). As will be explained hereafter, if the air temperatures at the plant site do not get too cold, the cooling loops do not require any isolation valves or other components in the cooling loops that have to actuate and the cooling loops are always available to operate.

Preferably, the coolant loops will contain a refrigerant, such as 245fa which will vaporize, for example, at approximately 180° F. (82° C.) at a pressure of approximately 120 psia (8.3 bar), or at 210° F. (98.9° C.) and 175 psia (12.1 bar). Thus, the heat exchangers 52 (heat exchanger 1) in the spent fuel pool and the in-containment refueling water storage tank will act as the evaporators to vaporize the refrigerant and pressurize the cooling loop in response to the spent fuel pool or the in-containment refueling water storage tank water temperature being heated, while the air cooled heat exchangers 54 (heat exchanger 2) act as condensers; creating a two-phase thermosiphon system which uses the large density difference between the liquid and vaporized refrigerant caused by the temperature change between the spent fuel pool or in-containment refueling water storage tank water and the cooling air to drive the flow of refrigerant and reject heat to the environment. In simpler terms, in this thermosiphon loop 56, the temperature of the water in the spent fuel pool and/or the in-containment refueling water storage tank causes the refrigerant to be heated and change to a gaseous state which pressurizes the cooling loop; the vaporized refrigerant rises to the condensing heat exchanger where the heated vapor is cooled by air and condensed; and gravity forces the liquefied refrigerant to flow back to the evaporating heat exchanger where the cycle is repeated.

The air cooled heat exchangers (condensers) 54 are preferably located in the lower portion of the passive containment cooling system cooling annulus 58 (as shown in FIG. 2), thus making use of the passive containment cooling system air flow path to generate natural air circulation into the AP1000® shielding building, down the annulus between the passive containment cooling system air baffle and the inside surface of the shield building 30, up the passive containment cooling system cooling annulus 58 between the containment vessel 28 and the passive containment cooling system air baffle 34, and out through the air exhaust structure 38 at the top center of the shield building 30; or located outside the containment building 22. The passive containment cooling system flow path is designed to be sufficiently large to obtain the air flow required to transfer the spent fuel and core decay heat while keeping the containment pressure below the containment vessel design pressure after three days of water assisted cooling.

When the plant is operating normally and the water in the spent fuel pool 24 and the in-containment refueling water storage tank 48 is being maintained at normal temperatures (less than or equal to 120° F. (48.9° C.), the cooling loops 50 will operate at low capacity and the 245fa refrigerant will vaporize such that the refrigerant pressure is less than or equal to 50 psia (3.4 bar). In this mode of operation, the heat transferred from the water to the air is limited by the low temperature difference between the water, the refrigerant, and the air, as well as the fact that the refrigerant vapor density is low which will result in higher flow velocities in the vapor riser pipe. If normal cooling of the spent fuel pool is disabled, or temperatures increase, more refrigerant will vaporize, the pressure in the loop will increase, increasing the refrigerant vapor density and temperature, and thus increasing the heat transferred to the air.

It is noted that if the environmental air temperature is low, the cooling loop may over cool the spent fuel pool and the in-containment refueling water storage tank water. In such applications where such a condition is likely, a fail open isolation valve 62 can be added to the cooling loop 50 to enable the operators to isolate the cooling loop and terminate heat transfer.

Preferably, the heat exchangers 52 submerged in the spent fuel pool 24 and the in-containment refueling water storage tank 48 (the evaporators) are different than the air cooled heat exchangers 54 (the condensers) in the passive containment cooling system cooling annulus 58 or outside the containment building 22. The evaporating heat exchangers 52 preferably have vertical tubes 64 attached to a lower and upper header pipe, respectively, 66 and 68. Each tube 64 preferably contains an inlet orifice to prevent parallel flow path instability when boiling of the coolant is occurring. The in-containment refueling water storage tank heat exchangers (condensers and their associated evaporators) are sized to transfer enough heat to the environment such that the containment pressurization following the drain down of the passive containment cooling water storage tank 38, three days after drain down initiation, would not exceed the containment design pressure.

The spent fuel evaporator heat exchangers 52 also consist of vertical tubes 64 attached to a lower and upper header pipe 66 and 68. Each tube would also contain an inlet orifice to prevent parallel flow path instability when boiling of the coolant is occurring. The spent fuel pool evaporator heat exchangers 52 will be sized to transfer enough heat to the environment such that the spent fuel pool water temperature would not exceed 200° F. (93.3° C.).

The spent fuel pool and the in-containment refueling water storage tank condensing heat exchangers 54 would consist of vertical tube heat exchangers 64 attached to a lower and upper header pipe 66 and 68, respectively, in which the tubes are vertically finned to increase their effective surface area, but still allow air flow up through the tube bundle. Preferably, the fins should be slightly wavy to create air turbulence to increase the effective tube to air heat transfer coefficient. The condensers 54 are located adjacent to the containment shell 28 outside surface and positioned inside the passive containment cooling system air baffle 34, just above the air baffle inlet flow guide 72; or placed outside of the containment building 28.

FIG. 5 provides a schematic side view of the heat exchangers 52 and 54 with the heat exchanger 52 submerged within the water within the in-containment refueling water storage tank 48 with a screen 74 around the heat exchanger tubes to prevent the flow area between the tubes 64 from fouling. The tube fins in the condenser heat exchanger 54 is shown in the enlarged cross section provided in FIG. 5A.

Accordingly, this invention supplements the invention called for in co-pending application Ser. No. 14/195,890 by extending the number of days that the spent fuel can be cooled passively in the event of the failure of on-site and off-site power to a nuclear power plant. The use of a refrigerant within the cooling loop under natural circulation enhances the efficiency of this process over an extended time period. Additionally, the active spent fuel pool cooling systems currently employed will get some additional cooling benefits from the systems described herein that will reduce the spent fuel pool water temperature and thus, the heat load on the current component cooling water systems.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear power plant, comprising:
   a nuclear steam supply system;
   a containment system comprising a containment enclosure for hermetically housing the nuclear steam supply system;
   an annulus adjacent an exterior surface of the containment enclosure;
   a reservoir comprising water, wherein the reservoir is housed within or within proximity of the containment enclosure;
   spent nuclear fuel submerged within the reservoir and cooled by the water; and
   a thermosiphon extending from within the reservoir to an exterior of the containment enclosure for transferring heat in the reservoir to air outside of the containment enclosure, wherein the thermosiphon comprises:
     a first heat exchanger at least partially submerged in the water, and
     a second heat exchanger thermally coupled to the first heat exchanger, wherein the second heat exchanger comprises an air-cooled heat exchanger positioned within the annulus.

2. The nuclear power plant of claim 1 wherein:
   the second heat exchanger is at a higher elevation than the first heat exchanger;
   the water on a first side of the first heat exchanger is in thermal communication with a working fluid on a second side of the first heat exchanger;
   the second side of the first heat exchanger is in fluid communication with a first side of the second heat exchanger through a closed loop in which the working fluid circulates; and the working fluid on the first side of the second heat exchanger is in thermal communication with ambient air outside the containment enclosure on a second side of the second heat exchanger.

3. The nuclear power plant of claim 2 wherein the working fluid is a refrigerant.

4. The nuclear power plant of claim 3 wherein the refrigerant is 245fa.

5. The nuclear power plant of claim 2 wherein a portion of the closed loop outside the containment enclosure comprises a finned tube.

6. The nuclear power plant of claim 2 wherein the containment enclosure comprises a steel shell having substantially vertical walls that extend from a lower portion of the containment system to an upper portion of the containment system.

7. The nuclear power plant of claim 6 including an air baffle extending substantially around and spaced from the vertical walls of the containment enclosure with an air inlet at a lower elevation of the air baffle and an air outlet at an upper elevation of the air baffle, the second heat exchanger being supported within an annulus between the vertical wall of the containment enclosure and the air baffle.

8. The nuclear power plant of claim 7 wherein the second heat exchanger is supported in a lower portion of the annulus or outside the containment.

9. The nuclear power plant of claim 2 wherein the first heat exchanger includes a plurality of first heat exchangers, the second heat exchanger includes a plurality of second heat exchangers and the closed loop includes a plurality of closed loops operating in parallel with each of the closed loops having at least one of the first heat exchangers and at least one of the second heat exchangers.

10. The nuclear power plant of claim 9 wherein each of the second heat exchangers are spaced around the outside of the containment.

11. The nuclear power plant of claim 2 wherein the closed loop includes a valve for cutting off circulation of the working fluid.

12. The nuclear power plant of claim 1 wherein the reservoir is a refueling water storage tank within the containment and the first heat exchanger is within the containment and the second heat exchanger is outside the containment.

13. The nuclear power plant of claim 1 wherein the reservoir is a spent fuel pool outside of and within proximity of the containment enclosure.

* * * * *